US012731096B2

(12) United States Patent
Huai et al.

(10) Patent No.: US 12,731,096 B2
(45) Date of Patent: Sep. 8, 2026

(54) MACHINE LEARNING BASED OCCUPANCY FORECASTING

(71) Applicant: Oracle International Corporation, Redwood Shores, CA (US)

(72) Inventors: Zuxuan Huai, New York, NY (US); Andrew Vakhutinsky, Sharon, MA (US); Kirby Bosch, Ann Arbor, MI (US); Jorge Luis Rivero Perez, Naples, FL (US)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 18/520,852

(22) Filed: Nov. 28, 2023

(65) Prior Publication Data

US 2025/0173660 A1 May 29, 2025

(51) Int. Cl.
*G06Q 10/06* (2023.01)
*G06Q 10/0637* (2023.01)
*G06Q 50/12* (2012.01)

(52) U.S. Cl.
CPC ....... *G06Q 10/06375* (2013.01); *G06Q 50/12* (2013.01)

(58) Field of Classification Search
CPC ...................................................... G06Q 10/06
See application file for complete search history.

(56) References Cited

U.S. PATENT DOCUMENTS 7,328,166 B1 2/2008 Geoghegan et al.
10,366,362 B1 7/2019 Reddy
11,948,111 B1 * 4/2024 Deng .................... G06N 3/082
2001/0034623 A1 10/2001 Chung
2002/0049535 A1 4/2002 Rigo et al.
2002/0065699 A1 5/2002 Talluri
2003/0177103 A1 9/2003 Ivanov et al.
2005/0033706 A1 2/2005 Krikler et al.
(Continued)

FOREIGN PATENT DOCUMENTS

CN 113408906 A 9/2021
WO 2021080668 A1 4/2021

OTHER PUBLICATIONS

Brownlee, “How to Avoid Overfitting in Deep Learning Neural Networks,” Machine Learning Mastery, 16 pages, (Year: 2019).
(Continued)

*Primary Examiner* — Nga B Nguyen
(74) *Attorney, Agent, or Firm* — Potomac Law Group, PLLC

(57) ABSTRACT

Embodiments determine a final occupancy prediction for a check-in date for a plurality of hotel rooms. Embodiments receive historical reservation data including a plurality of booking curves for the hotel rooms corresponding to a plurality of reservation windows, the historical reservation data including a plurality of features. Based on the historical reservation data, embodiments generate a first occupancy prediction for the check-in date using a first model and generate a second occupancy prediction for the check-in date using a second model. Embodiments determine a best performing model from at least the first model and the second model uses a corresponding occupancy prediction corresponding to the best performing model as the final occupancy prediction for the check-in date.

20 Claims, 13 Drawing Sheets

(56) References Cited

U.S. PATENT DOCUMENTS

| | | | |
|---|---|---|---|
| 2006/0149713 | A1 | 7/2006 | Walker |
| 2006/0200370 | A1 | 9/2006 | Ratliff et al. |
| 2007/0027745 | A1 | 2/2007 | Ouimet |
| 2007/0075136 | A1 | 4/2007 | Jacob |
| 2007/0124181 | A1 | 5/2007 | Feyder |
| 2007/0130201 | A1 | 6/2007 | Ratliff et al. |
| 2007/0241944 | A1 | 10/2007 | Coldren et al. |
| 2008/0091478 | A1* | 4/2008 | Messa .................... G06Q 10/04 705/5 |
| 2008/0091480 | A1 | 4/2008 | Geoghegan et al. |
| 2009/0124351 | A1 | 5/2009 | DeWaal et al. |
| 2009/0307020 | A1 | 12/2009 | Viale et al. |
| 2010/0153144 | A1 | 6/2010 | Miller et al. |
| 2011/0270646 | A1 | 11/2011 | Prasanna et al. |
| 2012/0053968 | A1 | 3/2012 | Debarge et al. |
| 2012/0130726 | A1 | 5/2012 | Subramanian |
| 2013/0041902 | A1 | 2/2013 | Swann et al. |
| 2013/0096962 | A1 | 4/2013 | Craig et al. |
| 2013/0132131 | A1 | 5/2013 | Fox et al. |
| 2014/0067439 | A1 | 3/2014 | Bosworth et al. |
| 2014/0095524 | A1 | 4/2014 | Fleischman et al. |
| 2014/0222518 | A1 | 8/2014 | Adkins |
| 2014/0236708 | A1 | 8/2014 | Wolff et al. |
| 2014/0310072 | A1 | 10/2014 | Wojciechowski |
| 2016/0042302 | A1 | 2/2016 | Watanabe et al. |
| 2016/0078374 | A1 | 3/2016 | Lippow et al. |
| 2016/0225108 | A1 | 8/2016 | Fishberg et al. |
| 2016/0267402 | A1 | 9/2016 | Szabo |
| 2017/0004590 | A1 | 1/2017 | Gluhovsky et al. |
| 2017/0076350 | A1 | 3/2017 | Fleischman et al. |
| 2017/0116624 | A1 | 4/2017 | Moore et al. |
| 2018/0349471 | A1 | 12/2018 | Toudji et al. |
| 2018/0357574 | A1 | 12/2018 | Pellerin et al. |
| 2019/0035009 | A1 | 1/2019 | Williams et al. |
| 2019/0244230 | A1 | 8/2019 | Subramanian et al. |
| 2019/0325463 | A1 | 10/2019 | Li et al. |
| 2020/0012956 | A1 | 1/2020 | Ikeda et al. |
| 2020/0043072 | A1 | 2/2020 | Li et al. |
| 2020/0184580 | A1* | 6/2020 | Ye ...................... G06Q 30/0202 |
| 2020/0327628 | A1* | 10/2020 | Mitra .................. G06F 16/9535 |
| 2021/0117998 | A1* | 4/2021 | Cho .................... G06F 18/2321 |
| 2021/0125111 | A1 | 4/2021 | Simon |
| 2021/0125207 | A1 | 4/2021 | Banerjee et al. |
| 2021/0136537 | A1 | 5/2021 | Zaltzman et al. |
| 2021/0142348 | A1* | 5/2021 | Banerjee ............... G06F 16/254 |
| 2021/0279647 | A1 | 9/2021 | Sivanandam et al. |
| 2022/0138783 | A1* | 5/2022 | Vakhutinsky .......... G06Q 10/02 705/5 |
| 2022/0166736 | A1 | 5/2022 | Freed |
| 2022/0197683 | A1 | 6/2022 | Potlapally et al. |
| 2022/0335072 | A1 | 10/2022 | Blaya et al. |
| 2022/0414557 | A1 | 12/2022 | Cho et al. |
| 2022/0414720 | A1* | 12/2022 | Fenichel ............ G06Q 30/0283 |
| 2023/0036167 | A1 | 2/2023 | Yusuf et al. |
| 2023/0153703 | A1* | 5/2023 | Natarajan .......... G06Q 30/0205 705/5 |
| 2023/0186411 | A1 | 6/2023 | Coulthurst et al. |
| 2023/0244752 | A1 | 8/2023 | Wasserkrug et al. |
| 2023/0376861 | A1 | 11/2023 | Vakhutinsky et al. |
| 2023/0401496 | A1* | 12/2023 | Manivannan ........ G06Q 50/163 |
| 2023/0401538 | A1 | 12/2023 | Saha et al. |
| 2023/0401657 | A1* | 12/2023 | Wallen ............. G06Q 10/06393 |
| 2024/0232729 | A1* | 7/2024 | Bouvrie ................. G06N 20/00 |
| 2025/0005512 | A1* | 1/2025 | Ward ...................... G06Q 10/08 |
| 2025/0078106 | A1* | 3/2025 | Seto ................... G06Q 30/0206 |

OTHER PUBLICATIONS

Cho et al., Optimal Dynamic Hotel Pricing, May 21, 2018.

Desai, "Expedia Recommender System," The Wayback Machine, 8 pages, (2018).

Elaheh Fata et al: "Multi-stage and Multi-customer Assortment Optimization with Inventory Constraints", arxiv.org, Cornell University Library, 201 Olin Library Cornell University Ithaca, NY 14853, Jul. 26, 2020, XP081703603, pp. 1-62.

Friedman et al., "Regularization Paths for Generalized Linear Models via Coordinate Descent", Journal of Statistical Software, Jan. 2010, vol. 33, issue 1.

Li, Y., Wang, B. and Caudillo-Fuentes, L.A. (2013) Modeling a hotel room assignment problem. Journal of Revenue and Pricing Management 12: 120-127.

Unknown, IBM SPSS Regression 22, Version 22, 43 pages, (Year: 2016).

Unknown, "UCLA Statistical Methods and Data Analytics", "Logistic Regression: Stata Data Analysis Examples",7 pages, (2022).

International Search Report and Written Opinion for International Application No. PCT/US2024/042027 dated Nov. 14, 2024.

International Search Report and Written Opinion for International Application No. PCT/US2024/052962 dated Feb. 6, 2025.

Li et al., "A Comparative Theoretical and Computational Study on Robust Counterpart Optimization: I. Robust Linear Optimization and Robust Mixed Integer Linear Optimization", Industrial & Engineering Chemistry Research, vol. 50, No. 18, pp. 10567-10603, Sep. 21, 2011.

Petropoulas et al., "Forecasting: Theory and Practice", ARXIV Orig, Cornell University Library, Ithaca, NY pp. 1-272, Jan. 5, 2022.

Sanchez-Medina et al., "Using Machine Learning and Big Data For Efficient Forecasting Of Hotel Booking Cancellations", International Journal of Hospitality Management, 9 pgs, May 31, 2020.

Viverit et al., "Application of Machine Learning to Cluster Hotel Booking Curves for Hotel Demand Forecasting", International Journal of Hospitality Management, 9 pgs, Mar. 23, 2023.

Webb et al., "Revenue Management Forecasting: The Resiliency of Advanced Booking Methods Given Dynamic Booking Windows", International Journal of Hospitality Management, vol. 89 9 pgs, Jun. 25, 2020.

Jiang, "Robust Capacity Control In Revenue Management: A Literature Review", Open Journal Of Business Management, vol. 6, pp. 488-497, 2018.

Lai, et al., "A Stochastic Approach To Hotel Revenue Optimization", Computers and Operations Research, Department of Management Sciences, pp. 1059-1072, 2005.

Vora, "When Your Hotel Is Overbooked, You Might Be Walked To Another", New York Times, 5 pgs, Feb. 18, 2019.

Feyzollahi et al., "Double/Debiased Machine Learning for Economists: Practical Guidelines, Best Practices, and Common Pitfalls", Department of Resource Economics, 38 pgs, Aug. 31, 2025.

Fouad et al., "A simulation-based overbooking approach for hotel revenue management," 2014 10th International Computer Engineering Conference, Giza, Cairo, Egypt, 2014, pp. 61-69.

Lee, " Modeling and Forecasting Hotel Room Demand Based on Advance Booking Information", Tourism Management 66, pp. 62-71, 2018.

Unknown, "Openkey The Evolution of Hotel Keys", By Canary Technologies, 9 pgs, Dec 21, 2018.

* cited by examiner

| Reservation window | Historical Date 1 | ... | Target Date |
|---|---|---|---|
| 60 | 3 | | 0 |
| 59 | 6 | | 2 |
| 58 | 6 | | 9 |
| 57 | 8 | | 12 |
| 56 | 10 | | 17 |
| 55 | 10 | | 19 |
| 54 | 11 | | 22 |
| 53 | 16 | | 20 |
| 52 | 18 | | 20 |
| ... | ... | | ... |
| 30 | 21 | | 26 |

| | Room count RMSE | Total adults RMSE | ... | Channel RMSE |
|---|---|---|---|---|
| Hist. date 1 | 0.65 | 0.98 | ... | 0.78 |
| Hist. date 2 | 0.77 | 0.88 | ... | 0.24 |
| Hist. date 3 | 0.83 | 0.54 | ... | 0.01 |
| ... | ... | ... | ... | ... |
| Target date | 0 | 0 | ... | 0 |

MACHINE LEARNING BASED OCCUPANCY FORECASTING

FIELD

One embodiment is directed generally to a computer system, and in particular to a computer system implementing machine learning based occupancy forecasting.

BACKGROUND INFORMATION

Revenue management is the process of dynamically adjusting prices of goods or services in response to changes in market conditions or changes in supply conditions. Revenue management processes were pioneered by the passenger airline industry and have been imitated by other industries such as cargo airlines, hotels, car rentals, shippers, advertisement brokers and others.

A very common application of revenue management relates to service providers who are taking reservations for "date-constrained services". Date-constrained services involve the imposition of transaction-specific limits on the date when the buyer may use the services they purchase. Examples of such a restrictions include specified arrival and departure dates for an airline reservation as well as specified check-in and check-out dates for a hotel reservation. The time restrictions make it particularly difficult to estimate demand and then determine optimized pricing that maximizes revenue/profit for date-constrained services, particularly in the hotel industry.

SUMMARY

Embodiments determine a final occupancy prediction for a check-in date for a plurality of hotel rooms. Embodiments receive historical reservation data including a plurality of booking curves for the hotel rooms corresponding to a plurality of reservation windows, the historical reservation data including a plurality of features. Based on the historical reservation data, embodiments generate a first occupancy prediction for the check-in date using a first model and generate a second occupancy prediction for the check-in date using a second model. Embodiments determine a best performing model from at least the first model and the second model uses a corresponding occupancy prediction corresponding to the best performing model as the final occupancy prediction for the check-in date.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
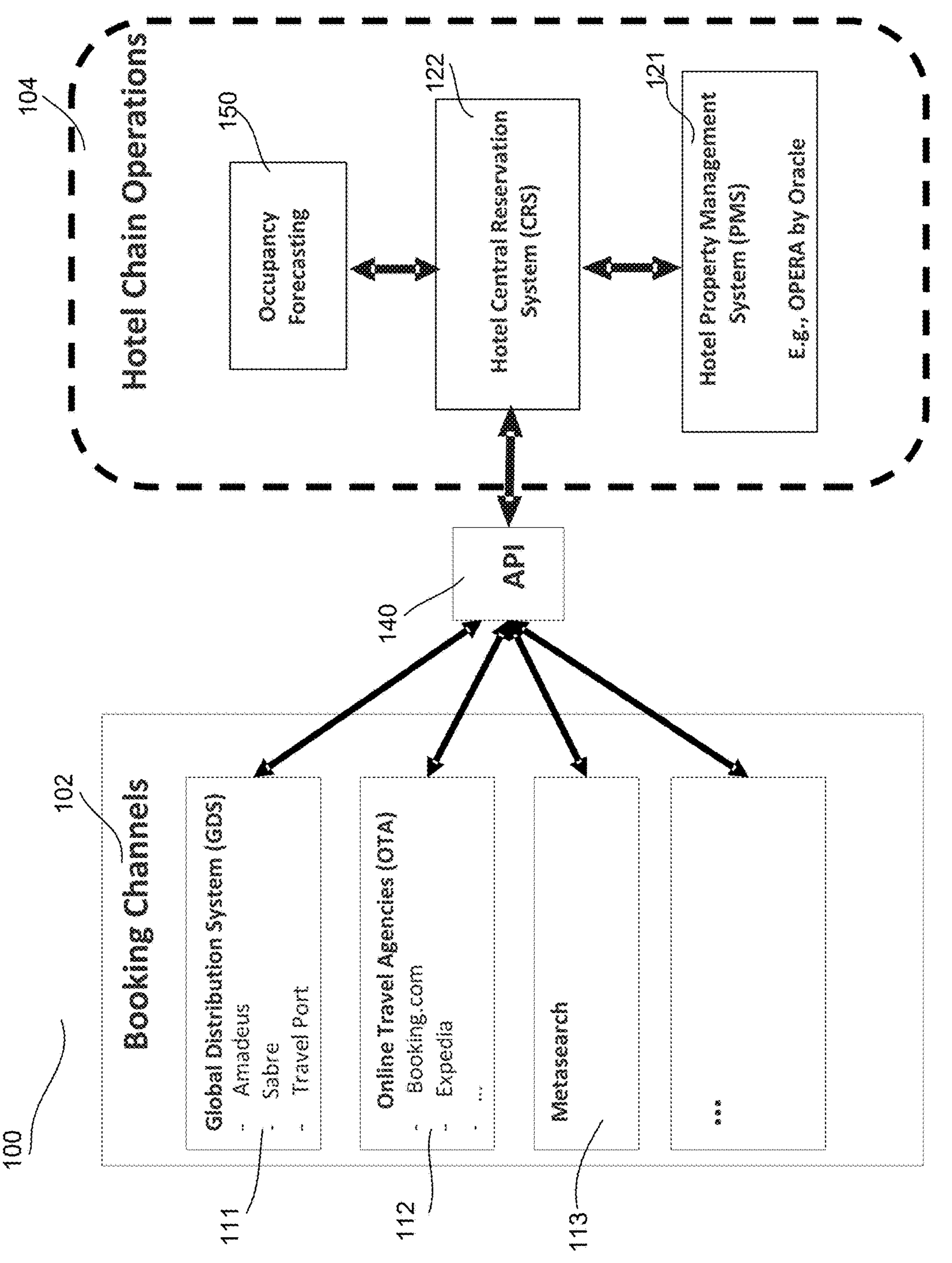
FIG. 1 is an overview block diagram of a hotel reservation system in accordance to embodiments of the invention.

Embodiments generate an occupancy forecast for a hotel or other date constrained services by using historical reservation patterns, and making occupancy predictions/forecasts using multiple machine learning models and selecting the best performing model, using booking curve similarity. Embodiments look at each business date individually in contrast to looking at occupancy for each business date as a consecutive series of data. Embodiments then optimize price and revenue based on the occupancy forecasts.

As disclosed, revenue management is a crucial component in hotel management as well as other date-constrained services. Room revenue makes up a large portion of revenue for many hotels. Room revenue in general terms can be defined as the number of rooms occupied times room rates. Revenue per available room ("RevPAR") is an important metric when evaluating the operation of a hotel.

Knowing how many rooms will be occupied for a given business date with high certainty in advance offers great help to optimize revenue so that revenue managers can adjust room rates accordingly. However, future hotel reservations can be hard to predict for several reasons. First, the occupancy may differ greatly depending on the day of a week. For example, room rates and occupancy tend to be higher on Fridays and Saturdays and lower on Sundays and other weekdays. Second, there is strong seasonality in hotel demand. There are high seasons and low seasons for tourism, conferences, and special events. In high seasons, rooms are harder to reserve and are usually booked at higher rates, and vice versa. Third, hotels have very different reservation patterns depending on the type of hotel, as the types include airport hotels, city center hotels, convention centers, resorts, etc. For example, convention centers will know in advance about a conference reservation and the expected number of rooms reserved, while airport hotels may have many last-minute bookings due to weather or delays. Finally, large-scale unexpected events may disrupt long existing patterns. For example, COVID had a large impact on the tourism industry before the release of vaccines.

All of the above characteristics make occupancy forecasting difficult using know approaches. In particular, occupancy predictions using known approaches such as moving average, or time-series forecasting with historical occupancy, generally have an unacceptable large margin of error.

One unique trait about hotel occupancy (and other date-constrained services) is that the final occupancy is strongly tied with reservations. Many reservations are made in advance. As the check-in date approaches, there is more and more certainty on predictions for occupancy.

For each business date, there is a reservation curve, which is the number of existing (i.e., non-cancelled) reservations as a function of the number of days before the occupancy night. All occupancy nights start with zero number of rooms reserved. As reservations come in, the number of rooms reserved increases. If a reservation is cancelled, then the number of rooms reserved for that date decreases. By looking at the historical reservation and cancellation data, each occupancy night in embodiments is mapped to a net cumulative reservation curve. With the intuition that if occupancy nights have similar reservation patterns, then the occupancy of those nights should also be similar, embodiments use the similarity between different reservation curves to predict future occupancy.

For a target date, embodiments use the reservations that has been made up to a reservation window (e.g., 30 days) and compare this set of reservations with all historical dates up to the same reservation window in the database under the same property. The most similar curves are determined with the k-smallest Mean Square Error ("MSE") or Weighted Mean Absolute Percentage Error ("WMAPE"). The median of the occupancy of these k-dates is the prediction for the target date.

As each reservation has multiple features, such as the number of adults and children, length of stay, the channel of the booking, room class, rate amount, etc., embodiments use this information to compute the similarity of the booking curves as essentially multidimensional curves. The fundamental assumption is that if multiple features are similar for a sequence of business dates, then the resulting occupancy should also be similar. To predict the occupancy, each feature of the target date booking curve is compared with that feature of the same time point on a booking curve for other historical dates, and certain proximity scores such as MSE or WMAPE are calculated to quantify the difference between any two curves. To take seasonality into account, the differences in weekdays and months between the target date and historical dates are also considered. These scores are standardized and compounded across all features to measure the similarity between dates. Similar dates are determined, and the median of their occupancy is used as a prediction for the target date.

Embodiments use multiple Machine Learning ("ML") prediction models that are tested on the historical reservation data for each hotel property or a group of properties. Embodiments determine that the best-performing models may differ among different properties. Additionally, this testing and validation process also allows for the selection of the best-performing set of hyper-parameters.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is an overview block diagram of a hotel reservation system 100 in accordance to embodiments of the invention. FIG. 1 includes booking channels 102 that a potential hotel customer may interact with to reserve a hotel room. The channels include a Global Distribution System ("GDS") 111, including "Amadeus", "Sabre", "Travel Port", etc., Online Travel Agencies ("OTA") 112, including "Booking.com", "Expedia", etc., Metasearch sites 113, and any other means for a customer to reserve a hotel room, including a website maintained by a hotel chain or individual hotel.

Each hotel chain operations 104 is accessed by an Application Programming Interface ("API") 140 as a Web Service such as a "WebLogic Server" from Oracle Corp. Hotel chain operations 104 includes a Hotel Property Management System ("PMS") 121, such as "OPERA Cloud Property Management" from Oracle Corp., a Hotel Central Reservation System ("CRS") 122, and an Occupancy Forecasting module 150 that interfaces with systems 121 and 122 to provide occupancy forecasting, and all other functionality disclosed herein. In embodiments, hotel chain operations 104 is implemented by a cloud based infrastructure. In one embodiment, the cloud based infrastructure comprises the "Oracle Cloud Infrastructure" ("OCI") from Oracle Corp.

A hotel customer or potential hotel customer that uses system 100 to obtain a hotel room typically engages in a three stage booking process. First an area availability search is conducted. Multiple hotel chains are shown and hotel CRS 122 provides static data. The static data can include the min/max rate, available dates, etc.

If the booking customer selects a hotel, they go to the next step which is the property search, including a single hotel property, multiple rooms and rate plans. For the single hotel property, information may include room category description data, rate plan description and room price, each of which is shown in a specific order. The property search includes real-time availability data and results in the booking customer selecting a room. Once the room is selected, the final step is final booking and the reservation being guaranteed by a credit card or other form of payment.

Figure 2:
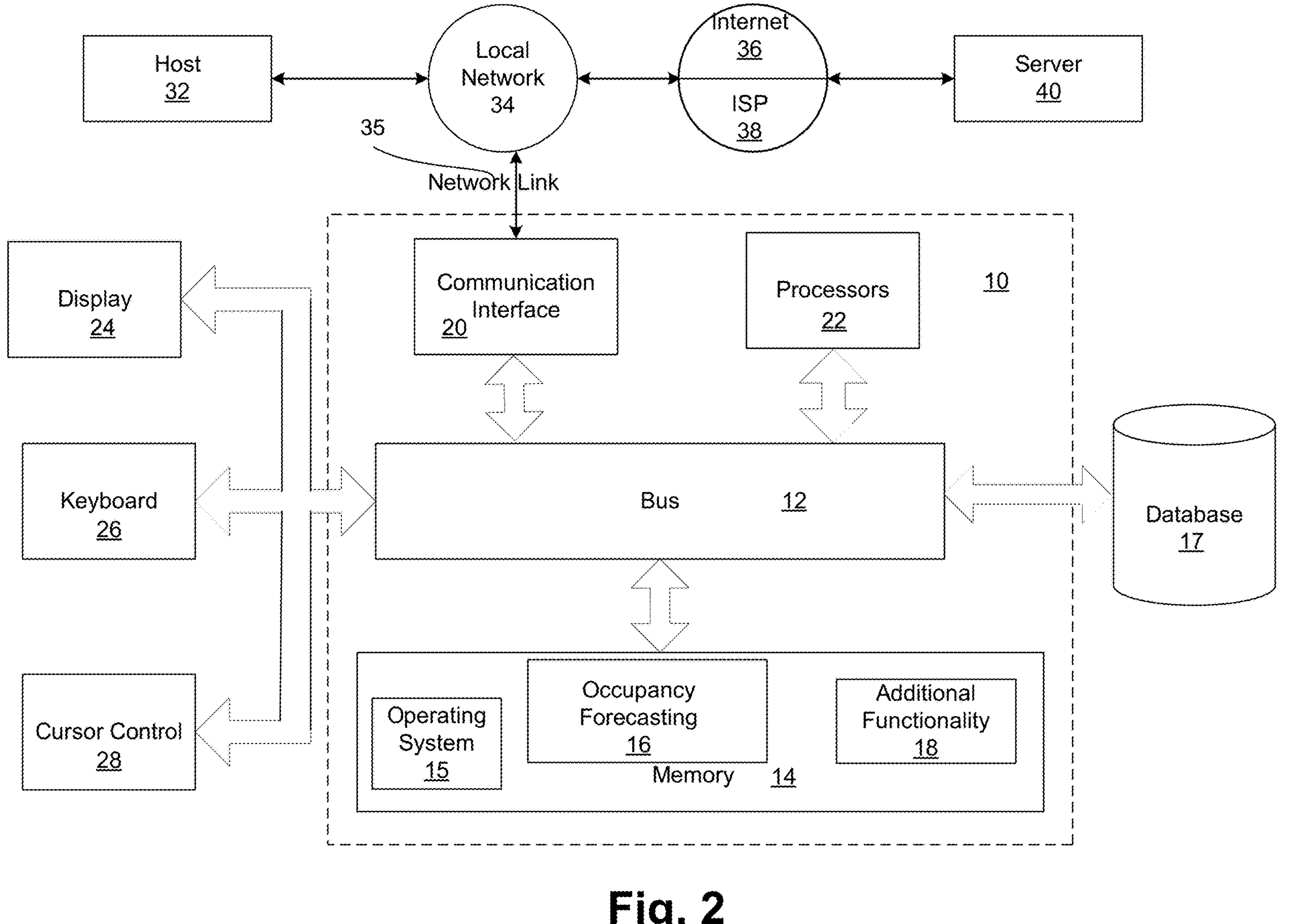
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, when implemented as a web server or cloud based functionality, system 10 is implemented as one or more servers, and user interfaces such as displays, mouse, etc. are not needed. In embodiments, system 10 can be used to implement any of the elements shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include occupancy forecasting module 16 that forecasts occupancy and determines optimize pricing for date-constrained inventory such as hotel rooms. System 10 can be part of a larger system. Therefore, system 10 can include one or more additional functional modules 18 to include the additional functionality, such as the functionality of a Property Management System ("PMS") (e.g., the "Oracle Hospitality OPERA Property" or the "Oracle Hospitality OPERA Cloud Services") or an enterprise resource planning ("ERP") system. A database 17 is coupled to bus 12 to provide centralized storage for modules 16 and 18 and store guest data, hotel data, transactional data, etc. In one embodiment, database 17 is a relational database management system ("RDBMS") that can use Structured Query Language ("SQL") to manage the stored data.

In embodiments, communication interface 20 provides a two-way data communication coupling to a network link 35 that is connected to a local network 34. For example, communication interface 20 may be an integrated services digital network ("ISDN") card, cable modem, satellite modem, or a modem to provide a data communication connection to a corresponding type of telephone line or Ethernet. As another example, communication interface 20 may be a local area network ("LAN") card to provide a data communication connection to a compatible LAN. Wireless links may also be implemented. In any such implementation, communication interface 20 sends and receives electrical, electromagnetic or optical signals that carry digital data streams representing various types of information.

Network link 35 typically provides data communication through one or more networks to other data devices. For example, network link 35 may provide a connection through local network 34 to a host computer 32 or to data equipment operated by an Internet Service Provider ("ISP") 38. ISP 38 in turn provides data communication services through the Internet 36. Local network 34 and Internet 36 both use electrical, electromagnetic or optical signals that carry digital data streams. The signals through the various networks and the signals on network link 35 and through communication interface 20, which carry the digital data to and from computer system 800, are example forms of transmission media.

System 10 can send messages and receive data, including program code, through the network(s), network link 35 and communication interface 20. In the Internet example, a server 40 might transmit a requested code for an application program through Internet 36, ISP 38, local network 34 and communication interface 20. The received code may be executed by processor 22 as it is received, and/or stored in database 17, or other non-volatile storage for later execution.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), software-as-a-service ("SAAS") architecture, or other type of computing solution.

Embodiments use historical reservation patterns incorporated with reservation windows to predict occupancy for date-constrained inventory such as hotel rooms. Embodiments generate multiple ML models (i.e., train an ML algorithm) to generate the prediction. For computational efficiency, a regression on the summary statistics at the selected forecast window is performed to identify the "important" features when making predictions, referred to as the n-window summary statistics regression model. Embodiments can also use this model to predict occupancy. Other embodiments model the historical patterns with functional regression, referred to as a "longitudinal model".

In embodiments, a number of functional data points are selected from the booking curve of each business date. Regression models are used to make predictions. Embodiments, using a similarity model, quantify the proximity of each of two curves with a score, such as MSE or WMAPE. When multiple features are compared for each business date, the proximity scores of these features are trained with regression models to make occupancy predictions. Since the best-performing models may differ among properties, these results are compared and analyzed across the models to optimize final occupancy predictions.

Figure 3:
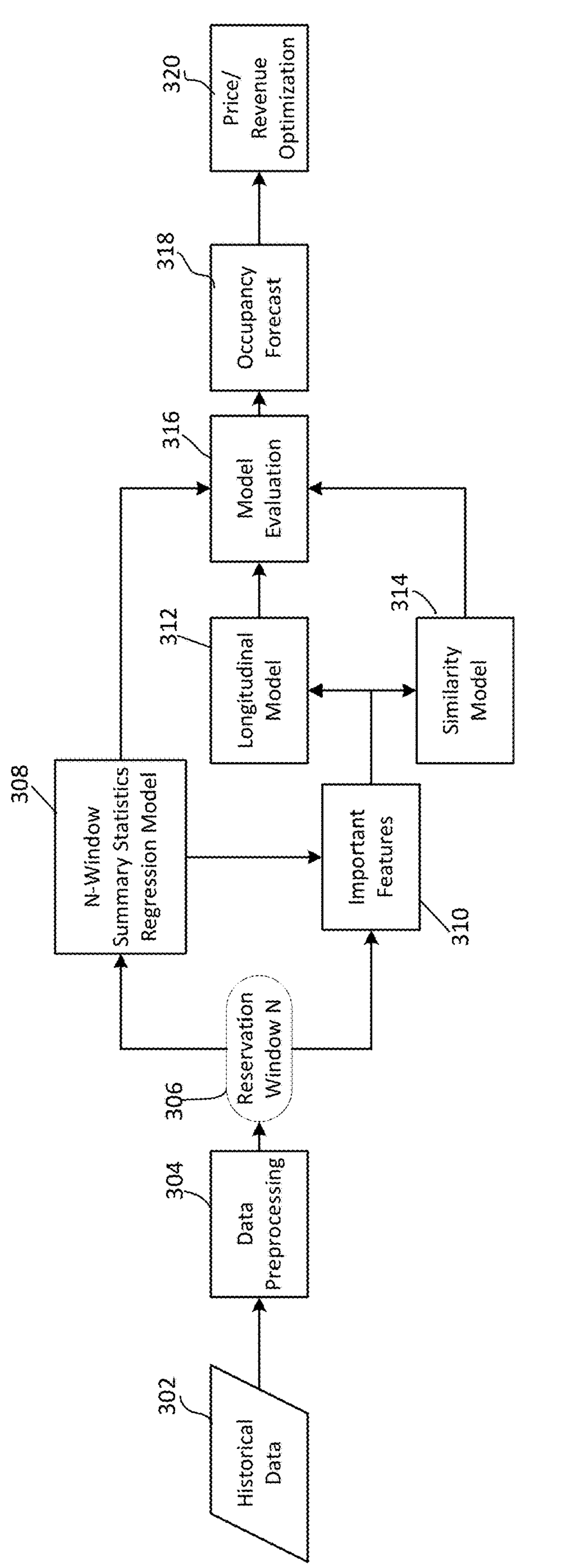
FIG. 3 is a flow/block diagram of the functionality of the occupancy forecasting module of FIG. 2 when forecasting/prediction occupancy and then optimizing prices in accordance to embodiments.

FIG. 3 is a flow/block diagram of the functionality of occupancy forecasting module 16 of FIG. 2 when forecasting/prediction occupancy and then optimizing prices in accordance to embodiments. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIG. 3 is disclosed for a hotel reservation system, but in other embodiments can be adapted to any date-constrained environment.

At 302, historical data is received. In embodiments, the historical data is received from a property management system, such as PMS 121 of FIG. 1. In embodiments, the historical data includes the following features:

- BUSINESS_DATE: The table is updated daily, with daily new arrival guests checked-ins, existing guests' current stays, and checked-outs.
- Unique IDs: RESV_NAME_ID, NAME_ID, etc.
- Date Related Columns:
  - BUSINESS_DATE_CREATED
  - INSERT_DATE
  - TRUNC_BEGIN_DATE
  - TRUNC_END_DATE
  - CANCELLATION_DATE
- RESV_STATUS: Checked in, Checked out, cancelled, no show, reserved.

GROUP_ID: Each entry represents one room, if a group reservation is made with multiple rooms, then those entries will have their unique IDs and the same Group ID Categorical Features
- RATE_CODE
- RATE_CATEGORY
- MARKET_MAIN_GROUP
- SOURCE_CODE
- SOURCE_MAIN_GROUP
- MARKET_CODE
- CHANNEL
- COUNTRY
- ROOM_CATEGORY
- ROOM_CLASS
- VIP STATUS ROOM: Room number of the checked-in reservation, used to verify valid rooms and unique reservations.

PHYSICAL_QUANTITY

ROOM_ADULTS

ROOM_CHILDREN

RATE_AMOUNT: Total amount paid by guest, some may include breakfast, tax included.

PSUEDO_ROOM_YN

PRIMARY_YN

STAY_ROOMS: 1 for checked in reservations, could be 0 or more for cancelled reservations.

At 304, the received historical data is pre-processed, which includes extracting features, encoding, and other feature engineering. Because embodiments forecast the occupancy a certain number of days before the check-in, it accounts for the number of current and cancelled reservations and their features. For each reservation, the following features commonly available in the hotel PMS are extracted:

Numerical features (including binary):

Booking window (how many days in advance the reservation is made)

Length of stay

Rate amount

Refundability

Number of adults

Number of children

Group reservation

Corporate discount

VIP status of the guest (yes/no)

Membership points or other accumulated reward level (if any)

Categorical features:

Room category

Rate plan (rack, best available (BAR), breakfast included, etc.)

Booking channel with the following alternatives:
- Online travel agency (OTA), e.g., Expedia
- Global distribution system (GDS), e.g., Apollo
- Hotel website or phone reservation system
- Other The categorical features listed above are encoded as one-hot numerical features. After that, the features are averaged over all active (i.e., non-cancelled) reservations booked for the target date.

Additional categorical features are collected for the date of stay and include:

Month of the year

Day of the week

Holiday or a special event

Finally, the total number of active reservations is used as a numeric feature.

Figure 4:
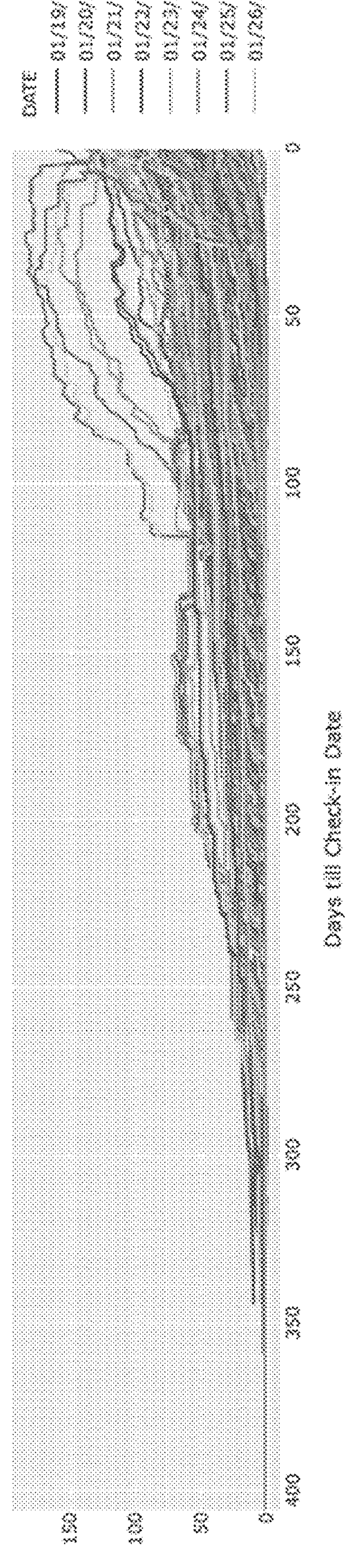
FIG. 4 illustrates example booking curves in accordance to embodiments.

The target variable of all forecast models disclosed below in embodiments is the occupancy level on the specific date for the specific property in terms of the percentage of available rooms. Further, in embodiments, all forecast models explore booking curves, which are the number of currently active reservations as a function of days before the stay date. FIG. 4 illustrates example booking curves in accordance to embodiments. In FIG. 4, there are 14 booking curves for the two-week period in July 2021. These curves are used to infer the value of the target variable based on the booking history in embodiments using the forecast models.

At 306, the subsequent functionality is executed for each reservation window N, where N is the number of days before the target check-in day (e.g., 20 days before check-in, 30 days before check-in, etc.). Thus, the input data include N repeated samplings of the reservations constituting a multi-dimensional booking curve.

At 308, an N-window summary statistics model, disclosed in detail below, provides an occupancy level prediction for a future date, as well as determines a subset of the features based on level of "importance". The subset of features are then used with a longitudinal model at 312, and a similarity model at 314, as disclosed below, to generate additional occupancy level predictions for the future date. At 316, the three models are evaluated to determine the best performing model by comparing their weighted mean absolute percentage errors ("WMAPE"), which is computed as $$\frac{1}{n}\sum_{i=1}^{n}\left|\frac{A_i - F_i}{A_i}\right|$$

where $A_i$ is the actual value and $F_i$ is the forecast value. Their difference is divided by the actual value $A_i$. The absolute value of this ratio is summed for every forecasted occupancy in the observation data and divided by the number of observations n. The prediction from the best performing model is then used for the occupancy forecast at 318. The occupancy forecast is then used at 320 to optimize the pricing of the hotel rooms.

In one embodiment, at 314 a similarity model is implemented. A machine learning similarity model, often referred to as a similarity model or similarity metric, is a type of model used in machine learning and data analysis to measure the similarity or dissimilarity between two or more data points. These data points can be in various forms, such as text documents, images, numerical vectors, or any other type of data. The goal is to quantify how alike or different these data points are based on their characteristics or features.

Figure 5:
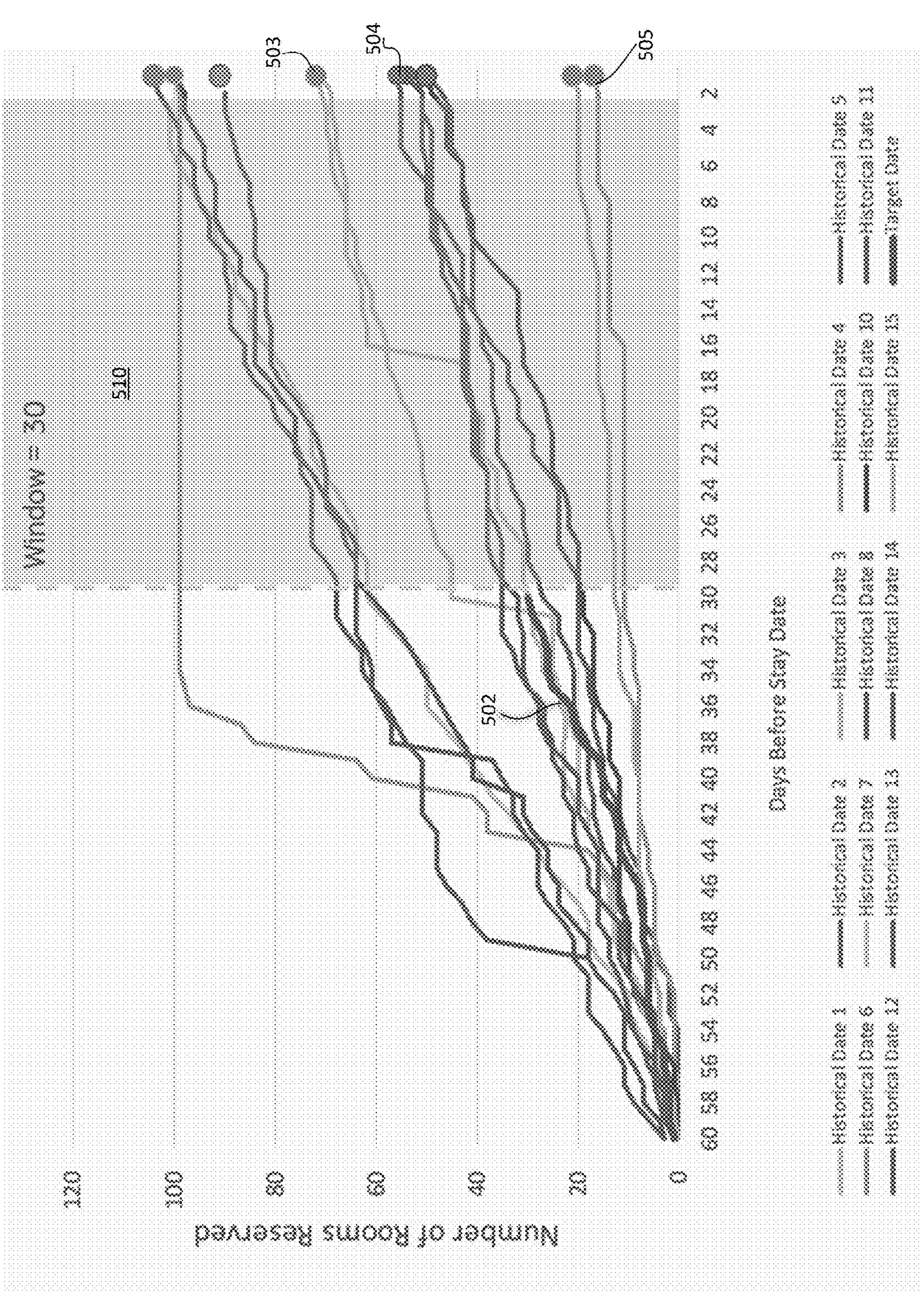
FIG. 5 illustrates example booking curves in accordance to embodiments.

The similarity model in embodiments assumes that if certain business dates share similar reservation patterns, then the final occupancy for those business dates should also be similar. FIG. 5 illustrates example booking curves in accordance to embodiments. As shown in FIG. 5, the booking curves follow approximately the same pattern. Each line in the graph represents a cumulative reservation curve for a business date in the past. These curves reflect the entire reservation pattern including the number of existing reservations for each day until the check-in date and the final occupancy on the stay date. They are labeled by the respective stay dates. Line 502 corresponds to the target date/curve, for which there is only partially observed data until the current observation date as the stay date is in the future. The occupancies on that date, denoted as Day 0 in the graph, is marked by dots 503, 504, 505, etc., in the graph. The reservation window of FIG. 5 is truncated to 60 days for illustration purposes and the forecast window 510 is 30 days. However, since the line 502 is the most similar to the line 504, it can be expected that the booking curve represented by the line 502 will result in the occupancy very close to the one represented by the line 504, which was observed in the past. Therefore, the occupancy forecast for the line 502 booking curve is set to the already observed occupancy for the line 504.

To forecast the occupancy thirty days out, embodiments compare the curves between 60 days until check in with the curves 30 days until check in. Similarity model 314 finds the k-most similar curves, and the median and mean occupancy of those k-similar dates are used as the predicted occupancy for the target date. The distance between target curve 502 and each historical curve is calculated with Root Mean Square Error ("RMSE"). The smaller the RMSE score, the more similar the two curves are. The RMSE is calculated between the target date and each historical date, where t=365, 355, . . . , forecast window=30. The curves with the smallest RMSE are used to predict the occupancy on the target date.

In embodiments, the similarity-based prediction model 314 is a type of k-nearest neighbors ("k-NN") non-parametric regression model. Since there are no estimated parameters, there is no training or fitting of the model. The model predicts by computing the average of the observed outputs of k nearest neighbors weighted by the inverse of the distance between the curves, which is computed using RMSE as defined above. Parameter k is a configured hyper-parameter, which in one embodiment is set to 7. Thus, the prediction for curve 502 will be based on curves 504 and three adjacent curves, 505 and the adjacent curve, and 503 and the adjacent curve, with most of the weight given to the nearest four curves (504 and three adjacent curves).

At 312, embodiments implement a longitudinal model in a similar manner as with the similarity model 314. Instead of using RMSE to determine the k-most similar reservation patterns, longitudinal model 312 extracts net cumulative datapoints every few days and fits this data to a regression model. A machine learning longitudinal model is a type of model designed to handle data with a temporal or longitudinal structure. Longitudinal data refers to data collected over a sequence of time points or observations for the same individuals, subjects, or entities. These models are used to analyze and make predictions based on the patterns and relationships within this time series data. Since there is a strong seasonality and weekday/weekend difference, month and weekday attributes are also added to the training data. Embodiments use a Random Forest regression model, which is trained on the observations described above. The trained model is used to forecast the occupancy using the newly observed data.

Figure 6:
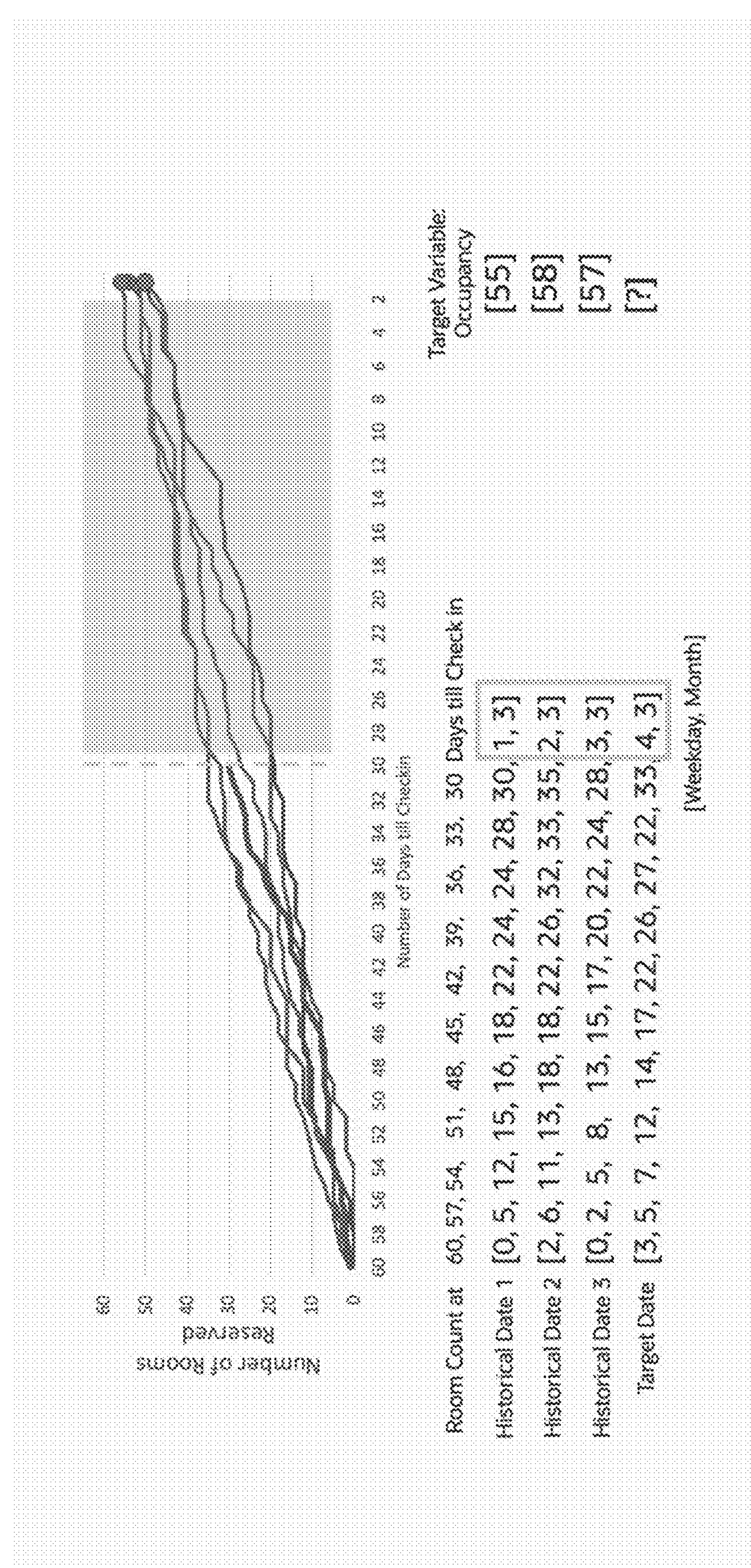
FIG. 6 illustrates example booking curves in accordance to embodiments.

FIG. 6 illustrates example booking curves in accordance to embodiments. An illustrative example of the observation set is shown in FIG. 6. The set of explanatory independent variables consists of the number of reservations at different days before the stay date and seasonality variables, which are weekday and month of the year treated as categorical variables. The dependent, or target variable, is the occupancy on the stay date.

At 308, embodiments implement an N-window summary statistics model. Instead of looking at historical reservation patterns consisting of only a number of reservations per day in the booking curve, model 308 is designed to allow more features to be considered. Such features include total adults, total rates, average stay length, number of each reservation from each channel, etc. Thus, the set of independent variables now consists of multiple features for every day selected for the booking curve. In other words, the booking curve becomes multidimensional. One advantage of this model is that it takes multiple features into account, so it offers great visibility on feature importance. However, as the number of features becomes very large, the model may start overfitting. The approach used in embodiments mitigates this effect by using regularization, which in this case is implemented by reducing the number of features to about one tenth of the number of observations. As the model is implemented as a Random Forest or Extreme Tree ensemble model, its features are selected based on their importance scores determined after training the model on the historical data. Thus, the model at 308 is used both as a regression-based predictive model as well as to select features to be used in other models disclosed below.

Figure 7:
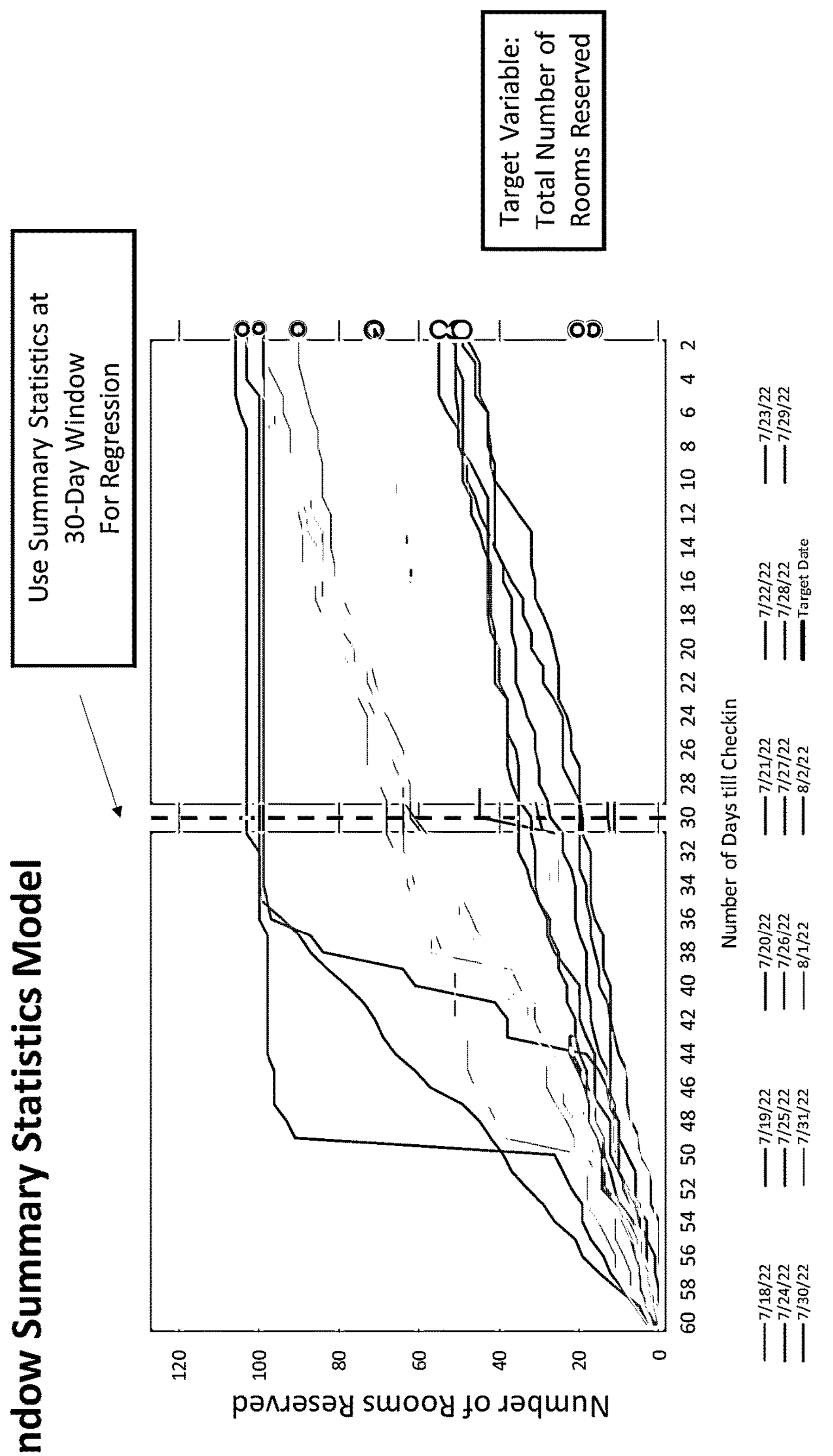
FIG. 7 illustrates example booking curves using an N-window summary statistics model in accordance to embodiments.

FIG. 7 illustrates example booking curves using an N-window summary statistics model in accordance to embodiments.

In embodiments, at 314, an enhanced similarity model is implemented, which is an extension of the "standard" similarity model disclosed above. In the standard similarity model disclosed, the predictions are made based on only a single value per sample day forming a single-dimensional curve—the historical reservation pattern. In the enhanced similarity model, multiple features are included as selected at 308 to prevent overfitting of the model The assumption remains the same: if several dates share similar patterns in multiple features, for example, room rates, reservation trend, distribution from channels, etc., then these dates should share a similar multidimensional booking curve. Evaluating the model across all features can be computationally expensive, so embodiments use the results from the N-window summary statistics model 308 to find the top ten (or other predefined number) of important features.

In standard similarity model, only the net cumulative room count of target dates is compared across all historical dates. In contrast, at 314 with the enhanced similarity model, such calculations are expanded to all important features, such that each feature of the target date is compared to the same feature across all historical dates. RMSE is calculated for each given feature and between each historical date and the target date. This multidimensional booking curve generalizes the standard similarity model, which can be considered as a special case of the enhanced similarity model.

Figure 8:
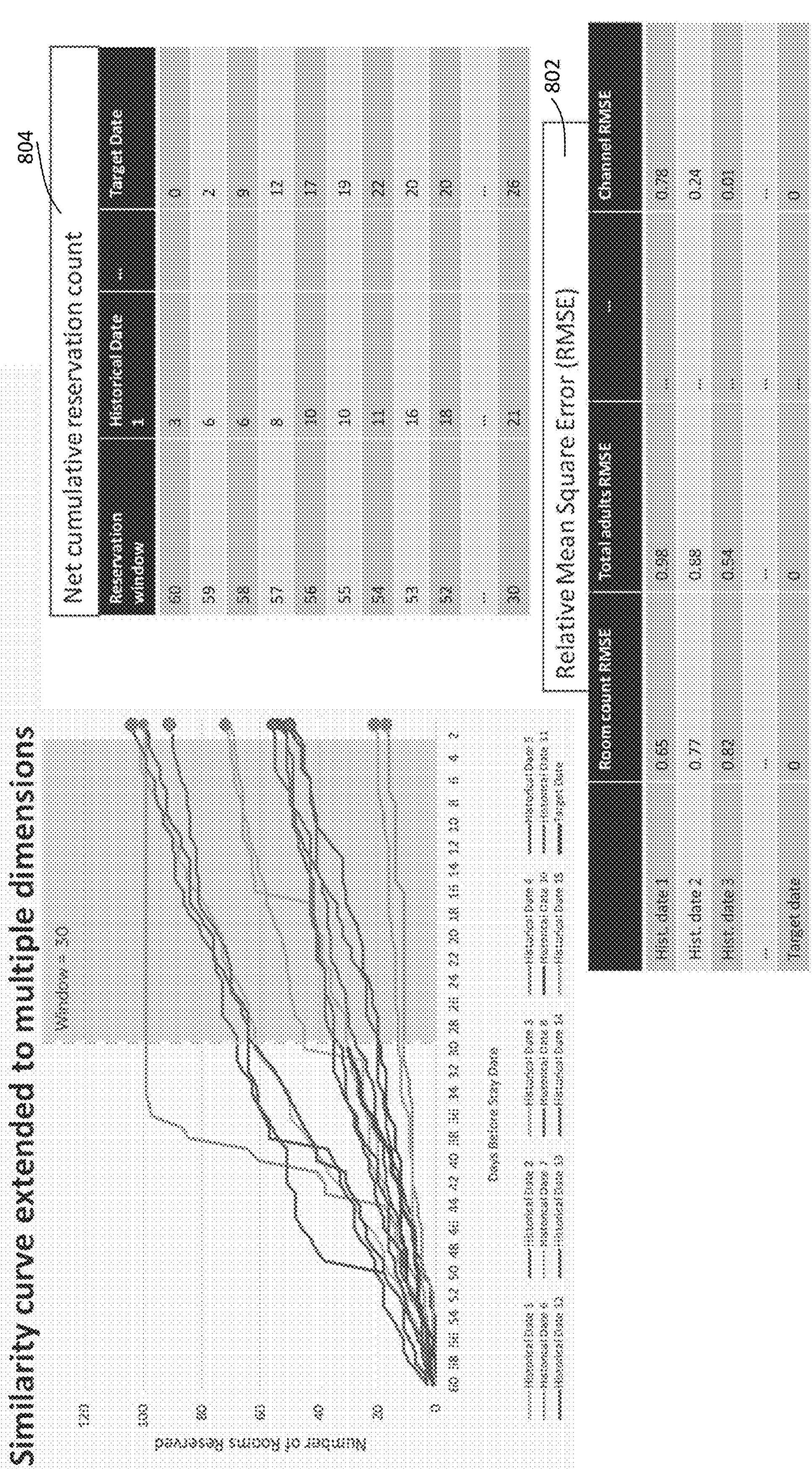
FIG. 8 illustrates example booking curves using the enhanced similarity model in accordance to embodiments.

FIG. 8 illustrates example booking curves using the enhanced similarity model in accordance to embodiments. As illustrated in FIG. 8, taking the example of the "important" feature of net cumulative reservation count at 804, the difference between two reservation curves is simplified to one RMSE score. For one feature, the difference between the target date curve and all other curves generates a column of RMSE scores. Each column in the RMSE table corresponds to one feature. Because different features have different units, for example the RMSE of rate amount will be much larger than the RMSE of net room count, but one feature is not more important than the other, the MSEs are standardized using a standard scaler and then normalized using a min-max scaler to values between 0 and 1. An example of the MSE table for a target date is shown at 802. As shown, the MSE for the target date row would be a list of zeros, since it is calculating the MSE between itself.

As with the standard similarity model, embodiments determine the row mean of each date, and the date with k-smallest weighted MSE would be the dates used for predictions. Alternatively, because a table of data is generated, and the target variable is the final occupancy, the prediction can be handled as a regression problem and can be trained with any regression model. Embodiments use Random Forest ("RF") and Extreme Tree ("ET") (i.e., Tree Ensembles), as regression models to be trained using the data described above. Later, these tree ensemble models are used for issuing price recommendations.

Feature Selection

As disclosed, at 310, a subset of "important" features is selected, with the subset to be used by the longitudinal model at 312 and by the similarity model at 314. In order to select the subset of features, let $f_{ij}$ be the jth feature of the ith reservation and $R_t(\tau)$ be the set of reservations with a stay date at time t that are active exactly $\tau$ days in advance. That is, the size of this set, $|R_t(\tau)|$ is the value of the booking curve for the occupancy date t at booking window $\tau$. Then $$F_{jt}(\tau) = \frac{1}{|R_t(\tau)|} \sum\nolimits_{i \in R_t(\tau)} f_{ij}$$

will denote the average feature value for all N features. These N features are used in the N-window model at 308 by applying Random Forest regression. As the Random Forest regression provides the importance of these features based on their predictive power for the occupancy forecast, the subset of $N_0$ features are selected with the highest importance, where $N_0$ is a configurable hyperparameter.

The enhanced similarity model at 314 and the longitudinal model at 312 use the subset of the features $F_{jt}(\tau)$, $j \in N_0$ sampled at booking windows $\tau_1, \tau_2, \ldots, \tau_M$. Thus, the total number of predictive variables becomes NOM, which is kept at about 10% of the number of observations, which is the number of hotel occupancy days in the historical data set. For example, if the reservation history is stored for the last three years, that is, about one thousand days, the total number of predictive features is set to one hundred, or, for example, the ten most important reservation features sampled over ten booking window periods, e.g., 10 weeks. After that, the enhanced similarity model at 314 would use them to find k nearest curves as follows: Let $g_j$ be the importance of feature j. Then the distance between any two booking curves would be computed as $$\sum_{m=1}^{M} \sum_{j \in N_0} g_j \Delta F_j(\tau_m)^2$$

where $\Delta F_j(\tau_m) = F_{jt_1}(\tau_m) - F_{jt_2}(\tau_m)$ is the feature difference between two curves corresponding to the occupancy dates $t_1$ and $t_2$. In other words, the booking curve distance will be smaller for the occupancy dates with the similar booking curves. Therefore, the occupancy prediction is essentially a KNN (k nearest neighbors) method with the distance computed according to the above expression.

In the longitudinal model at 312, these $N_0M$ features are used as predictive variables in the Random Forest regression.

Price/Revenue Optimization

At 320, embodiments optimize the hotel revenue by finding the optimal set of rates and other control features that would maximize the product of the average rate and occupancy forecasted at 318. Specifically, embodiments use the individual estimators (i.e., decision trees) of the ensemble regressors such as Random Forest ("RF") or Extreme Tree ("ET") built as disclosed above and finds the optimal values of the control variables that lead to the leaves of the decision trees with the optimal average values.

Embodiments denote the set of predictor feature variables by z=(x,w) where x is the vector of the controlled feature values such as room rates, booking limits, etc., which is essentially optimization or treatment variables and w are environmental variables such as a day of the week that are constant for every given optimization problem scenario. Each individual estimator is a decision tree where at each node a split occurs based on some preselected feature.

Let t=1, . . . , T is the estimator index and [T] is the set of all estimators. For the estimator t, denote its set of nodes where splitting occurs on x variables as $$N_x^t,$$

and its set of leaf nodes as $L^t$. For each node $$j \in N_x^t,$$

l(j) and r(j) are, respectively, its left and right children and for $$j \in N_x^t \cup L^t \setminus \{\text{Root}(t)\},$$

p(j) is the parent of the node. Also, for each node $j \in L^t$, the value of the revenue is denoted as $$v_j^t.$$

For each node $$j \in N_x^t,$$

i(j,t) is the feature, on which the splitting occurs, and $x_{i(j,t)}$ and $$b_j^t$$

are the corresponding decision variable and the splitting threshold, respectively. Finally, embodiments define an auxiliary binary decision variable for each edge in the tree t and denote it as.

$$q_{p(j),j}^t.$$

Figure 9:
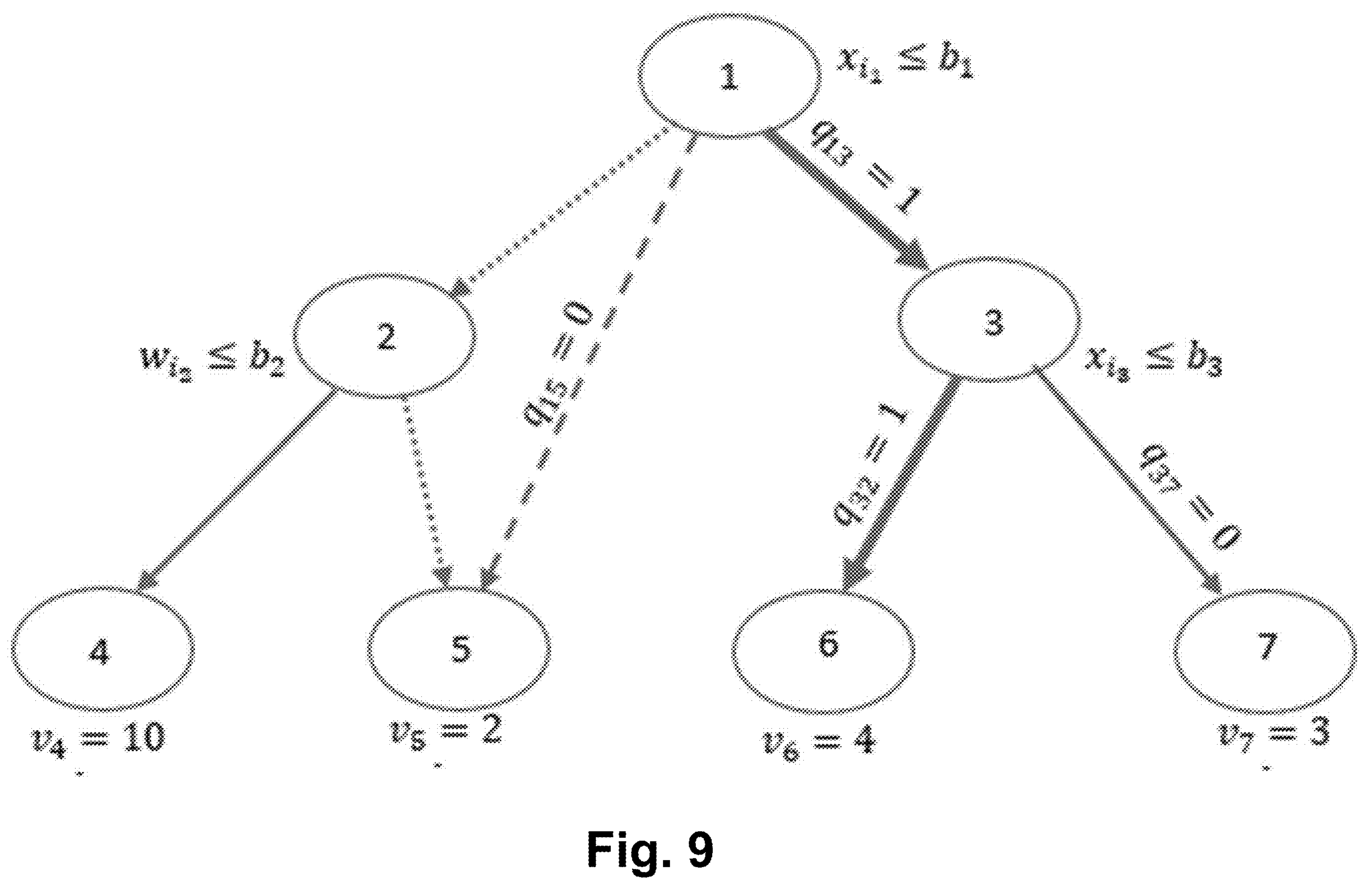
FIG. 9 illustrates the construction of the estimator tree and the associated decision variables in accordance to embodiments.

FIG. 9 illustrates the construction of the estimator tree and the associated decision variables in accordance to embodiments. In this tree, the leaf node set $L^t$={5,6,7} and the feature splitting node set $$N_x^t = \{1, 3\}.$$

As node 2 splits the environmental feature, which is constant for the scenario, this node is skipped by connecting node 1 directly to node 5. FIG. 9 further illustrates the use of the decision variables, q and x. The auxiliary q variables determine the path from the root node 1 to the leaf 6 based on the specific x variable values that correspond to the right branch at the root and left branch at node 3 resulting in the objective function value $v_6=4$ at the leaf node 6. This construction is formulated as a Mixed Integer Linear Program ("MILP") formulation below.

$$\max_{x,q} \frac{1}{T}\sum_{t=1}^{T}\sum_{j\in L^t} v_j^t q_{p(j),j}^t$$

Subject to:

$$x_{i(j,t)} - M\left(1 - q_{j,l(j)}^t\right) \le b_j^t,\ \forall\ t \in [T],\ j \in N_x^t \quad (1)$$

$$x_{i(j,t)} + M\left(1 - q_{j,r(j)}^t\right) \ge b_j^t,\ \forall\ t \in [T],\ j \in N_x^t \quad (2)$$

$$q_{j,l(j)}^t + q_{j,r(j)}^t = q_{p(j),j}^t,\ \forall\ t \in [T],\ j \in N_x^t \quad (3)$$

$$\sum_{j\in L^t} q_{p(j),j}^t = 1,\ \forall\ t \in [T] \quad (4)$$

$$q_{j,l(j)}^t,\ q_{j,r(j)}^t,\ q_{p(j),j}^t \in \{0, 1\},\ \forall\ t \in [T],\ j \in N_x^t \quad (5)$$

In the MILP formulation above, constraints (1-2) enforce the variable splitting only when the splitting node is on the active path from the root to a leaf. They use the "big M notation", where M is a large constant. In this formulation, it can be set to the a-priori known upper bound of x, that is, $M_{j,t}=\max x_{i(j,t)}$. Constraint (3) ensures the path continuity from the root to a leaf. Constraint (4) is to ensure that only one leaf is selected. Finally, constraint (5) requires the auxiliary q variables to be binary. The solution to the optimization problem are the values of the decision x variables that provide the paths in all estimator trees to the leaves with the greatest average value.

The price/revenue optimization at 320 is applied to solving the revenue optimization problem for one or more days of the planning horizon by finding the optimal rates that are used in the occupancy forecast.

In response to the optimized room pricing at 320, selections of rooms optimally priced are offered to customers, and one of the rooms is selected and reserved in response to the optimized pricing, and a hotel stay is facilitated based on reservation. Facilitating the hotel stay in embodiments include transmitting the specialized data to other specialized devices that use the data, such as using the data to automatically encode hotel keys, using the data to automatically program hotel room door locks, etc.

In embodiments, once the optimized prices are determined above, the display order and product assortment can be further optimized using the discrete-choice model disclosed in U.S. patent application Ser. No. 17/643,638, the disclosure of which is hereby incorporated by reference.

In embodiments, the price optimization disclosed above is run on a daily basis based on the remaining inventory. In this case, the invention enhances the MILP optimization problem described above by adding a set of inventory constraints for every room category c from a category set C as follows:

$$\frac{1}{T}\sum_{t=1}^{T}\sum_{j\in L^t} u_{jc}^t q_{p(j),j}^t \le b_c \quad \forall\ c \in C \quad (6)$$

In the above constraint (6), for each node, $j\in L^t$, $$u_{jc}^t$$

denotes the number of rooms that are occupied in the room category c and $b_c$ denotes the booking limit for the category. The booking limit is updated based on the current reservation level.

Example Cloud Infrastructure

FIGS. 10-13 illustrate an example cloud infrastructure that can implement hotel chain operations 104 that can include occupancy forecasting system 10 of FIG. 2 in accordance to embodiments.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS" s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
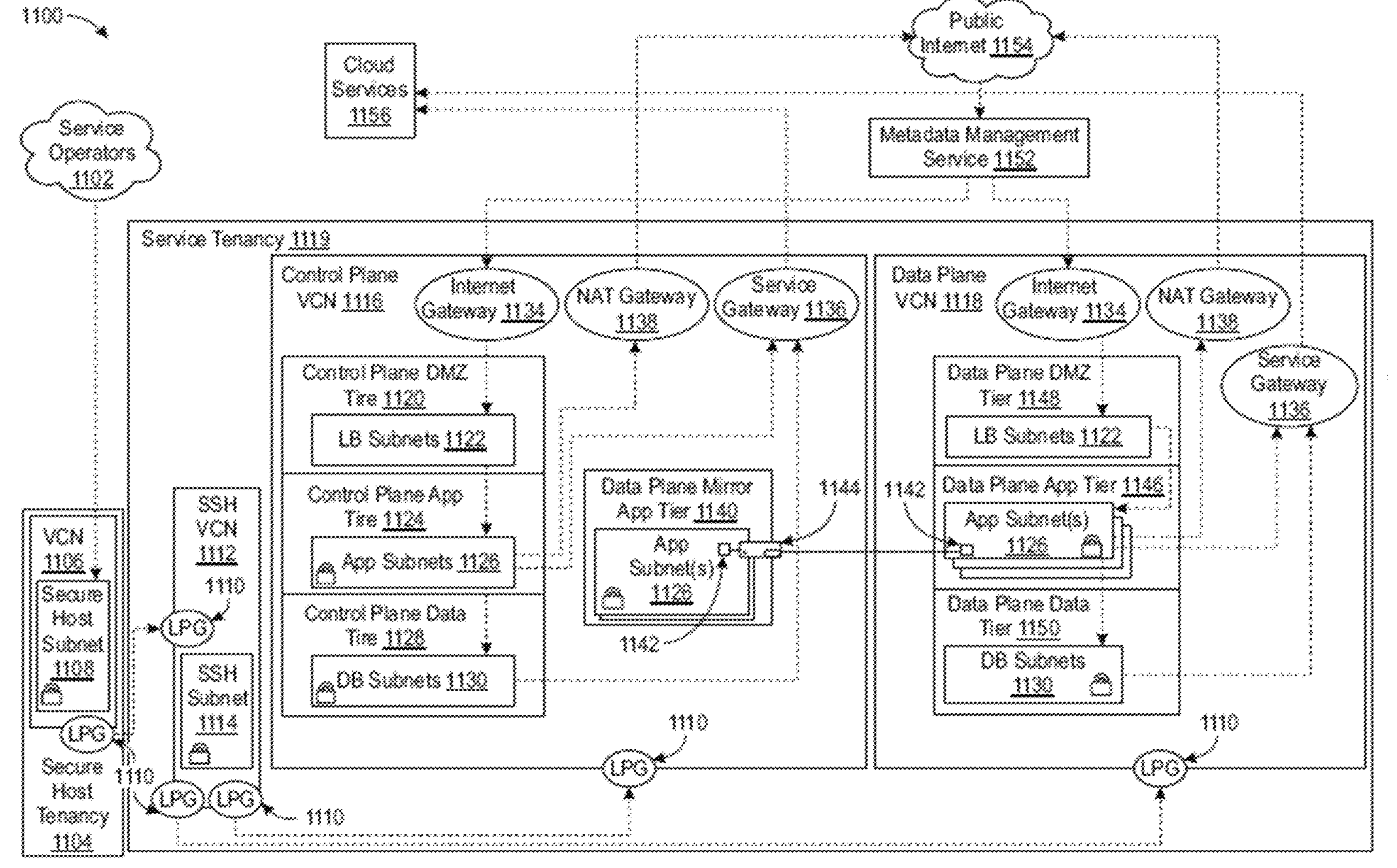
FIGS. 10-13 illustrate an example cloud infrastructure that can incorporate a network cloud that can include the occupancy forecasting system of FIG. 1 in accordance to embodiments.

FIG. 10 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 11:
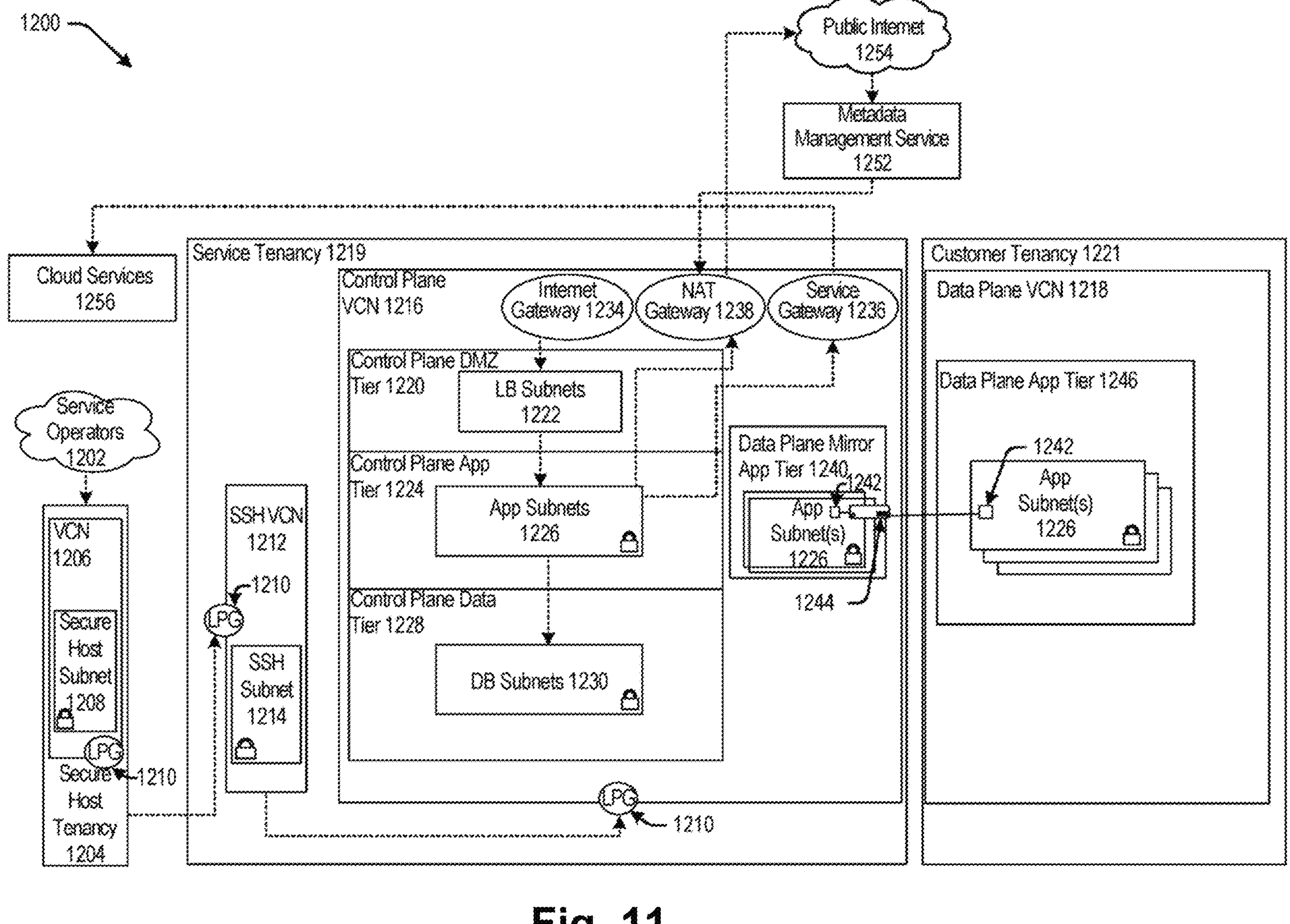

FIG. 11 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 12:
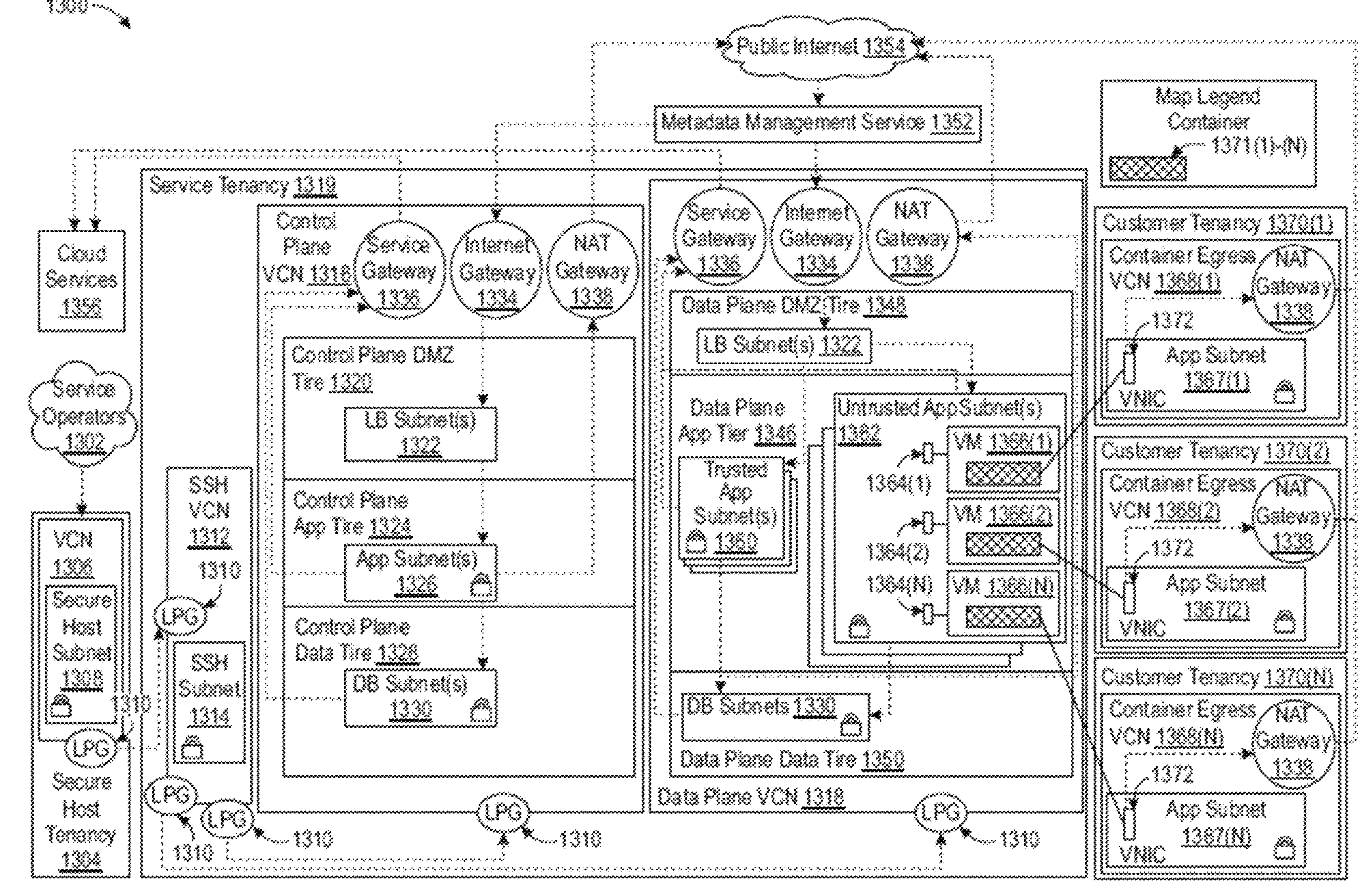

FIG. 12 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 10). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 13:
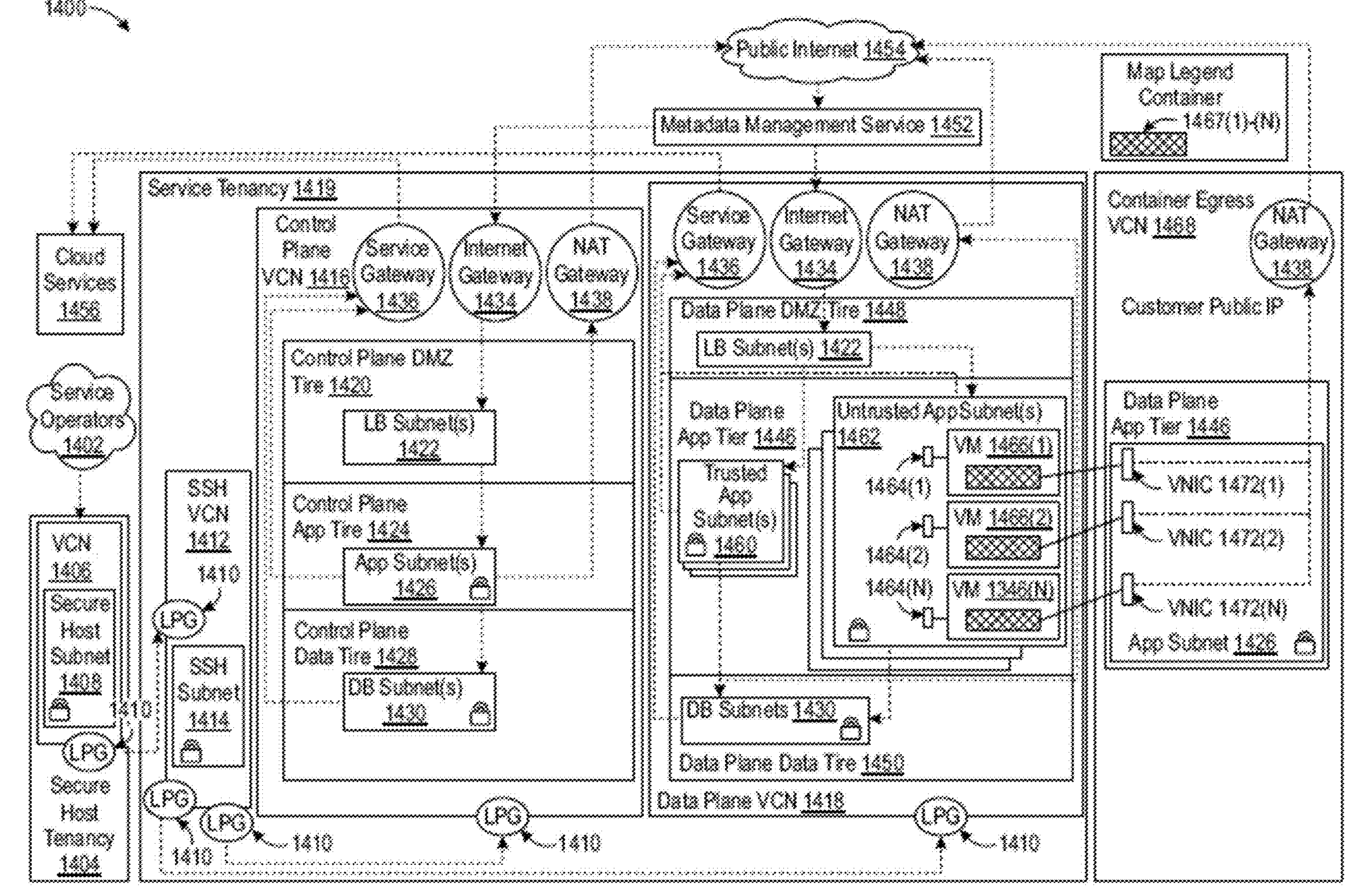

FIG. 13 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 10) and a network address translation (NAT) gateway 1438 (e.g. the NAT gateway 1138 of FIG. 10). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 13 may be considered an exception to the pattern illustrated by the architecture of block diagram 1300 of FIG. 12 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

As disclosed, embodiments generate an occupancy forecast by handling the prediction for each business date independently. Embodiments do not use any time series data and do not require any statistical calculations on time series data. The dips and spikes in occupancy due to weekdays or seasonality are part of the nature of hotel reservations. Embodiments do not try to de-seasonalize or smooth the occupancy but instead embrace these sudden changes by making predictions based on similar characteristics.

Embodiments provide great visibility. From the similarity model, it is easy to identify which dates are used to make a prediction. By looking at coefficients and feature importance, it is also easy to tell how each feature contributes to the predicted occupancy.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of operating a reservation system by determining a final occupancy prediction for a target check-in date for a plurality of hotel rooms, the method comprising:

receiving historical reservation data comprising a plurality of booking curves for the hotel rooms corresponding to a plurality of reservation windows, each of the plurality of reservation windows comprising a number of existing reservations as a function of a different number of days before the target check-in date, the historical reservation data comprising a plurality of features;

for each of the plurality of booking curves:

using an N-window summary statistics model, where N is the number of days before the target check-in date, generating a first occupancy prediction for the target check-in date and determining a subset of the plurality if features based on a level of importance of each of the features;

using the subset of the plurality of features, generating a second occupancy prediction for the target check-in date using a second model and generating a third occupancy prediction for the target check-in date using a third model;

determining a best performing model among the N-window summary statistics model, second model and third model;

using a corresponding occupancy prediction corresponding to the determined best performing model as the final occupancy prediction for the target check-in date;

determining optimized pricing for the hotel rooms based on the final occupancy prediction comprising using ensemble trees formulated as a Mixed Integer Linear Program;

displaying a plurality of available hotel rooms;

receiving a reservation for one of the available hotel rooms;

in response to the reservation, generating corresponding specialized data and transmitting the specialized data; and in response to receiving the specialized data, automatically encoding a corresponding hotel room key.

2. The method of claim 1, wherein the second model comprises a similarity model and the third model comprises a longitudinal model.

3. The method of claim 2, wherein the similarity model comprises a k-nearest neighbors non-parametric regression model.

4. The method of claim 2, wherein the longitudinal model comprises a Random Forest regression model.

5. The method of claim 1, wherein the determining the best performing model comprises comparing weighted mean absolute percentage errors for each of the models.

6. The method of claim 1, wherein the displaying the plurality of available hotel rooms comprises, based on the optimized pricing, determining an optimized order to display available rooms.

7. A non-transitory computer readable medium having instructions stored thereon that, when executed by one or more processors, cause the processors to operating a reservation system by determining a final occupancy prediction for a target check-in date for a plurality of hotel rooms, the operating a reservation system comprising:

receiving historical reservation data comprising a plurality of booking curves for the hotel rooms corresponding to a plurality of reservation windows, each of the plurality of reservation windows comprising a number of existing reservations as a function of a different number of days before the target check-in date, the historical reservation data comprising a plurality of features;

for each of the plurality of booking curves:

using an N-window summary statistics model, where N is the number of days before the target check-in date, generating a first occupancy prediction for the target check-in date and determining a subset of the plurality if features based on a level of importance of each of the features;

using the subset of the plurality of features, generating a second occupancy prediction for the target check-in date using a second model and generating a third occupancy prediction for the target check-in date using a third model;

determining a best performing model among the N-window summary statistics model, second model and third model;

using a corresponding occupancy prediction corresponding to the determined best performing model as the final occupancy prediction for the target check-in date;

determining optimized pricing for the hotel rooms based on the final occupancy prediction comprising using ensemble trees formulated as a Mixed Integer Linear Program;

displaying a plurality of available hotel rooms;

receiving a reservation for one of the available hotel rooms;

in response to the reservation, generating corresponding specialized data and transmitting the specialized data; and in response to receiving the specialized data, automatically encoding a corresponding hotel room key.

8. The computer readable medium of claim 7, wherein the second model comprises a similarity model and the third model comprises a longitudinal model.

9. The computer readable medium of claim 8, wherein the similarity model comprises a k-nearest neighbors non-parametric regression model.

10. The computer readable medium of claim 8, wherein the longitudinal model comprises a Random Forest regression model.

11. The computer readable medium of claim 7, wherein the determining the best performing model comprises comparing weighted mean absolute percentage errors for each of the models.

12. The computer readable medium of claim 7, wherein the displaying the plurality of available hotel rooms comprises: based on the optimized pricing, determining an optimized order to display available rooms.

13. A cloud based hotel reservation system that determines a final occupancy prediction for a target check-in date for a plurality of hotel rooms, the system comprising:

an N-window summary statistics model;

a second model;

a third model; and one or more processors adapted to:

receive historical reservation data comprising a plurality of booking curves for the hotel rooms corresponding to a plurality of reservation windows, each of the plurality of reservation windows comprising a number of existing reservations as a function of a different number of days before the target check-in date, the historical reservation data comprising a plurality of features;

for each of the plurality of booking curves:

using the N-window summary statistics model, where N is the number of days before the target check-in date, generate a first occupancy prediction for the target check-in date and determining a subset of the plurality if features based on a level of importance of each of the features; using the subset of the plurality of features, generate a second occupancy prediction for the check-in date using the second model and generate a third occupancy prediction for the check-in date using the third model;

determine a best performing model among the N-window summary statistics model, the second model and the third model;

use a corresponding occupancy prediction corresponding to the determined best performing model as the final occupancy prediction for the target check-in date;

determine optimized pricing for the hotel rooms based on the final occupancy prediction comprising using ensemble trees formulated as a Mixed Integer Linear Program;

display a plurality of available hotel rooms;

receive a reservation for one of the available hotel rooms;

in response to the reservation, generate corresponding specialized data and transmitting the specialized data; and in response to receiving the specialized data, automatically encode a corresponding hotel room key.

14. The system of claim 13, wherein the displaying the plurality of available hotel rooms comprises, based on the optimized pricing, determining an optimized order to display available rooms.

15. The method of claim 1, wherein the determining the final occupancy prediction comprises using a cloud infrastructure comprising:

a first virtual cloud network (VCN) comprising a local peering gateway (LPG) communicatively coupled to a secure shell (SSH) VCN via the LPG.

16. The method of claim 15, wherein the LPG is contained in a control plane VCN and the SSH VCN is communicatively coupled to a data plane VCN.

17. The system of claim 13, wherein the second model comprises a similarity model and the third model comprises a longitudinal model.

18. The system of claim 13, further comprising a cloud infrastructure that hosts the one or more processors, the cloud infrastructure comprising:

a first virtual cloud network (VCN) comprising a local peering gateway (LPG) communicatively coupled to a secure shell (SSH) VCN via the LPG;

wherein the LPG is contained in a control plane VCN and the SSH VCN is communicatively coupled to a data plane VCN.

19. The system of claim 17, wherein the similarity model comprises a k-nearest neighbors non-parametric regression model.

20. The system of claim 17, wherein the longitudinal model comprises a Random Forest regression model.

* * * * *